Nov. 10, 1936.  W. T. HANCOCK  2,060,306
TUBE STILL
Filed Nov. 6, 1934  2 Sheets-Sheet 1
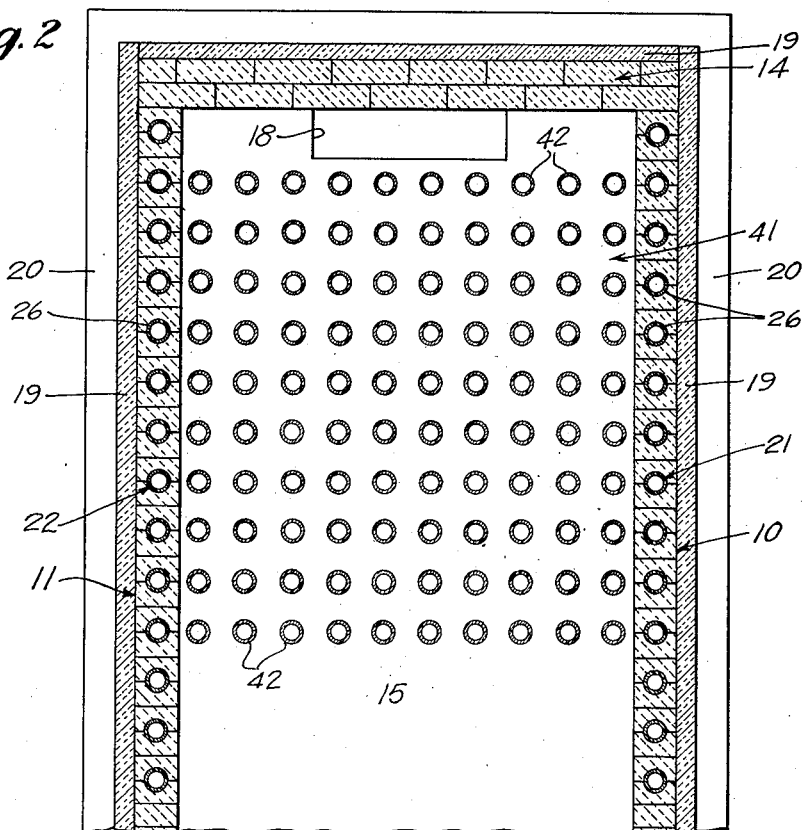
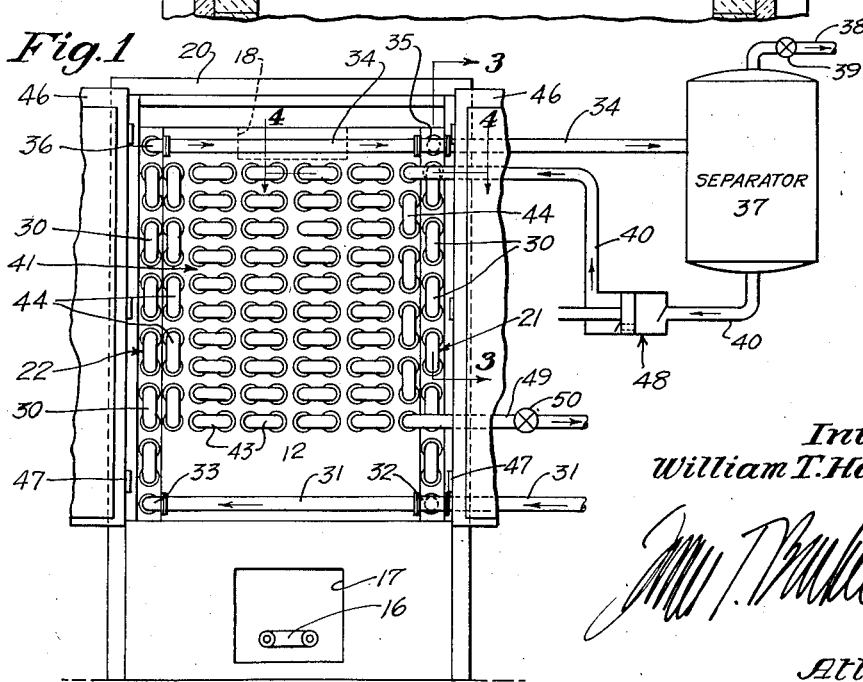
Inventor
William T. Hancock.
Attorney.

Nov. 10, 1936.   W. T. HANCOCK   2,060,306
TUBE STILL
Filed Nov. 6, 1934   2 Sheets-Sheet 2
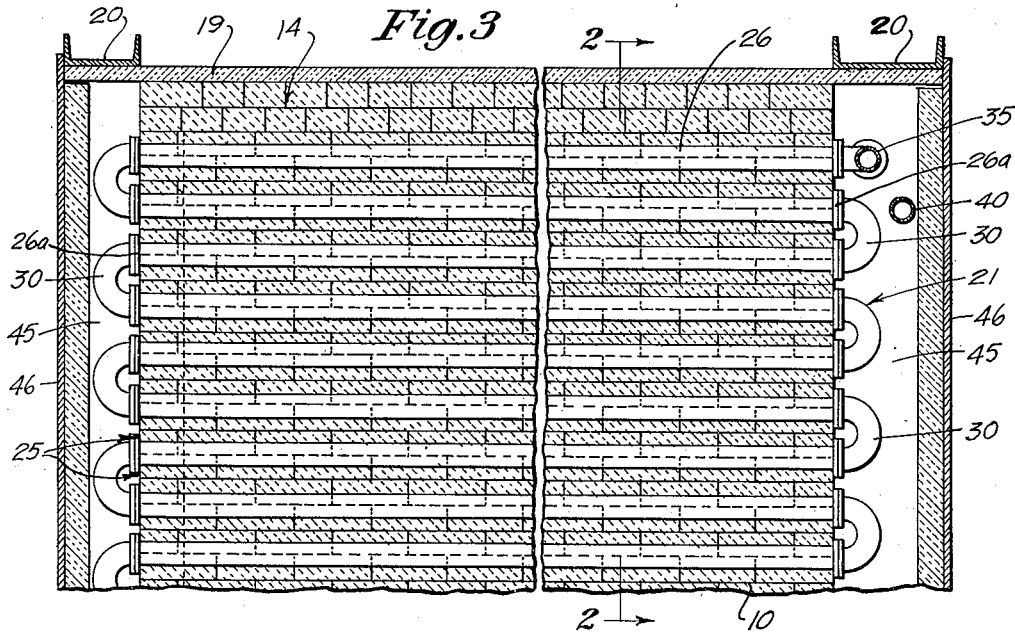
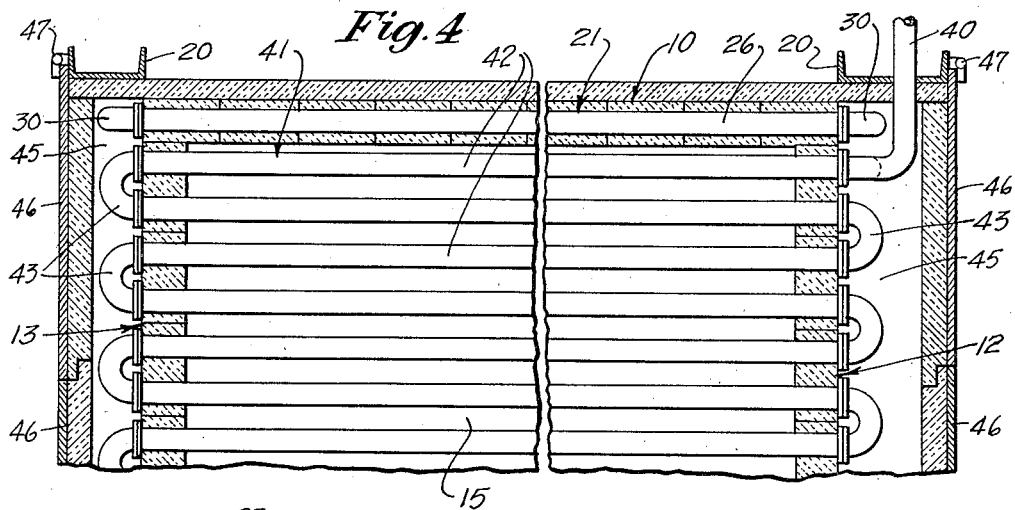
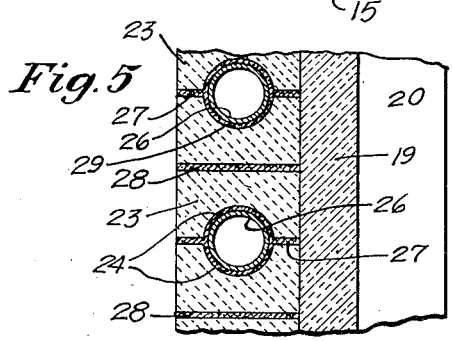
Inventor
William T. Hancock.
Attorney.

Patented Nov. 10, 1936

2,060,306

UNITED STATES PATENT OFFICE 2,060,306

TUBE STILL

William T. Hancock, Long Beach, Calif.

Application November 6, 1934, Serial No. 751,729

1 Claim. (Cl. 196—116)

This invention deals generally with oil cracking tube stills, and has for its principal object to effect substantially greater heat economies in the transference of heat from the combustion chamber to the oil flowing through the tubes, than can be obtained in the usual types of tube stills. More specifically, the invention aims to accomplish this general purpose by conserving and transferring to the oil a substantial portion of the heat that ordinarily is lost through the walls of the still.

In the usual tube still, the tubes are placed within the heating chamber in direct exposure to the hot combustion gases, and the same is true of various cracking stills in which the charging stock is preheated by passage through one bank of tubes and then passed through cracking tubes within which the oil is heated to the highest temperatures. In such combined oil preheating and cracking stills, the preheating tubes, like the cracking tubes, are placed directly within a heating chamber though in a somewhat lower temperature zone, usually one through which the combustion gases flow after having heated the cracking tubes. Because of the high temperatures existing within the heating zones, a considerable loss of heat necessarily occurs through the walls of the still, notwithstanding the common practice of applying heat insulation to the walls.

In accordance with the invention, such heat losses are reduced to a minimum by placing a series of oil heating tubes in the wall of the heating chamber, so that a substantial portion of the heat that would ordinarily be lost through the wall will be transferred to the oil. The invention is broadly applicable to various types of stills, although it has its preferred application in connection with combined oil cracking and preheatng tube stills. Applying the invention to this type, I pass the charging stock through tubes located within one or more walls of the still to preheat or top the oil of its lighter fractions, and then circulate the preheated oil through cracking tubes located within the heating chamber and in direct exposure to the hot gases. Means are provided for separating vapors evolved from the oil after passage through the preheating tubes, and for forcing the oil through the cracking tubes under high pressure.

All the various objects and aspects of the invention will be understood more clearly from the following detailed description of a typical and preferred embodiment. Reference is had throughout the description to the accompanying drawings in which:

Fig. 1 is a general view showing the still in end elevation with the doors swung open, and also showing the separator and pump interposed between the preheating and cracking tubes;

Fig. 2 is an enlarged sectional view taken through the upper portion of the still in the plane of line 2—2 of Fig. 3;

Fig. 3 is an enlarged fragmentary section taken through one of the side walls of the still in the plane of line 3—3 in Fig. 1;

Fig. 4 is an enlarged fragmentary section taken as indicated by line 4—4 of Fig. 1; and Fig. 5 is an enlarged fragmentary view showing the arrangement of the preheating tubes and fire bricks in the side walls of the still.

In the drawings I show a simple still construction comprising side walls 10, 11, front and rear end walls 12, 13, and a top wall 14. Chamber 15 is heated by combustion gases from burners 16 within opening 17 in the front wall 12 of the still, the combustion gases rising within the heating chamber and flowing out through flue opening 18 in the rear wall. Suitable heat insulating material 19 is applied to the walls of the still, and the entire structure is braced by a suitable exterior steel frame 20.

Oil preheating tube banks, generally indicated at 21 and 22, are contained within side walls 10 and 11 of the still, the tubes being unexposed to the hot gases in chamber 15 and receiving heat conducted into the walls from the combustion chamber. Although the walls may be built in various manners to accommodate the tubes, I preferably construct them of fire brick shaped and arranged as shown particularly in Fig. 5. The bricks 23 are made of the usual high temperature resistant clay and are shaped to provide longitudinally extending, substantially semi-circular recesses 24. These bricks are arranged in a vertical series of horizontally extending courses 25, see Fig. 3, with the recesses 24 of each course in end to end continuation, and with the recesses of adjacent courses placed oppositely to form circular openings to receive the tubes 26. The joints 27 in the sides of recesses 24 may be cemented, as may also the joints at 28 between the opposite continuous surfaces of the bricks. It may be desirable to fill in any clearance spaces at 29 between the tubes and the fire bricks, with pulverized clay or other heat conductive material so as to maintain a high rate of heat transfer from the bricks 23 to the tubes. As illustrated, the layer 19 of heat insulating material may be applied directly to the outer surface of the wall to prevent heat losses to the atmosphere, and to maintain as high as possible temperature differential between the wall and the tubes.

As shown best in Fig. 3, the oil preheating tubes 26 are joined in series by return bends 30 connected to the flanged ends 26a of the tubes projecting beyond the ends of the wall. Charging stock is fed to both banks of preheating tubes through a line 31 connecting at 32 with tube bank 21 and at 33 with tube bank 22. The charging stock is preheated during the course of its upward flow through the series connected tubes and is discharged through a common line 34 connecting with the upper ends of the tube banks at 35 and 36. Ordinarily the oil will be preheated to a temperature sufficiently high that some of the lighter fractions will vaporize, in which event line 34 is connected with a separator 37 from which the vapors are withdrawn through an outlet line 38. A pressure regulating valve 39 in the vapor line may be set to maintain any desired back pressure on the oil flowing through the preheating tubes. By maintaining a substantial back pressure, say as high as 100 lbs. per sq. in., heat transfer rates within the oil preheating tubes may be materially increased because of limited vaporization under the existing pressure.

Unvaporized oil flows from separator 37 through line 40 to a bank 41 of cracking tubes placed within heating chamber 15 and in direct exposure to the hot gases. The cracking tubes 42 may be placed within the heating chamber in any suitable arrangement and location. Typically they are shown to be arranged in horizontal rows and to be supported by the end walls 12 and 13 of the still. The tubes in each horizontal row are connected in series by return bends 43, and the rows in turn are series connected by return bends 44. As shown most clearly in Fig. 4, spaces 45 beyond the end walls of the still containing the various return bends connecting the tubes, are enclosed by doors 46 hinged at 47 to the sides of the still. By opening doors 46 and removing the return bend connections, both the preheating and cracking tubes are rendered easily accessible for cleaning.

The preheated oil is forced under high pressure by pump 48 into the uppermost row of cracking tubes, and is heated to cracking temperatures as it flows downwardly through the tubes to be discharged through outlet line 49. Pressure regulating valve 50 in the outlet line may be set to maintain a back pressure of several hundred lbs. per sq. in. on the oil undergoing cracking. The cracked oil stream may be discharged through line 49 to a separator (not shown) and the vapors fractionated by any of the usual methods.

From the foregoing, the advantages and heat economies accomplished by the invention will be apparent. Structurally the invention has the advantage that both cracking and preheating tube connections may be combined in a comparatively small still having a single heating chamber. Then in addition to the economical advantages of a small compact unit having these features, there is the saving in thermal efficiency due to substantial reduction of heat losses by building the preheating tubes into the walls of the still. It may be mentioned that whereas I have shown the preheating tubes to be placed within only two side walls of the still, where conditions warrant, these preheating tube banks may be incorporated in additional walls to more completely surround the heating chamber.

I claim:

The combination comprising, an oil cracking still having walls forming a heating chamber, a plurality of oil cracking tubes contained within said chamber in direct exposure to hot gases rising therein from the bottom to the top of the chamber, separate banks of oil preheating tubes contained within the side walls of said chamber and unexposed to the hot gases, a supply line connecting with the lowermost tubes of said preheating tube banks, an outlet line connecting the uppermost tubes of said preheating tube banks with the cracking tubes, means in said outlet line for separating and drawing off vapors from the preheated oil, a pump in said line for discharging the preheated oil through the cracking tubes under high pressure, and means for independently controlling the pressures in said preheating and cracking tubes.

WILLIAM T. HANCOCK.